US008524096B2

(12) United States Patent
Miyata (10) Patent No.: US 8,524,096 B2
(45) Date of Patent: Sep. 3, 2013

(54) METHOD OF MANUFACTURING LIQUID CRYSTAL DISPLAY DEVICE (75) Inventor: Sumio Miyata, Saitama (JP)

(73) Assignee: Japan Display Central Inc., Fukaya-shi (JP)

( * ) Notice: Subject to any disclaimer, the term of this patent is extended or adjusted under 35 U.S.C. 154(b) by 197 days.

(21) Appl. No.: 13/155,653

(22) Filed: Jun. 8, 2011

(65) Prior Publication Data
US 2011/0300781 A1 Dec. 8, 2011

(30) Foreign Application Priority Data

Jun. 8, 2010 (JP) .................................. 2010-131498

(51) Int. Cl.
C30B 33/00 (2006.01)
(52) U.S. Cl.
USPC .................................. 216/23; 216/88; 216/89
(58) Field of Classification Search
USPC .............................................. 216/23, 88, 89
See application file for complete search history.

(56) References Cited

U.S. PATENT DOCUMENTS

| 2004/0105065 | A1* | 6/2004 | Jung et al. | 349/153 |
| 2005/0030471 | A1* | 2/2005 | Liou | 349/190 |
| 2005/0248715 | A1* | 11/2005 | Byun et al. | 349/187 |
| 2008/0137027 | A1* | 6/2008 | Tashiro et al. | 349/189 |
| 2010/0259707 | A1* | 10/2010 | Iwata et al. | 349/73 |
| 2011/0297645 | A1* | 12/2011 | Miyata | 216/23 |

FOREIGN PATENT DOCUMENTS

| JP | 2008-170673 | 7/2008 |
| JP | 2008-216780 | 9/2008 |
| JP | 2009-251155 | 10/2009 |

OTHER PUBLICATIONS

Japanese Office Action issued Apr. 17, 2012, in Japan Patent Application No. 2010-131498 (English translation only).
U.S. Appl. No. 13/155,674, filed Jun. 8, 2011, Miyata.

* cited by examiner

*Primary Examiner* — Shamim Ahmed
(74) *Attorney, Agent, or Firm* — Oblon, Spivak, McClelland, Maier & Neustadt, L.L.P.

(57) ABSTRACT

In one embodiment, a first substrate including first and second array regions are prepared. The first and second array regions respectively include first and second active areas. A peripheral seal material having an air intake opening is arranged outside the first and second array regions. A second substrate is arranged on the surface of the first substrate in which the first and second seal materials and peripheral seal material are formed in a vacuum chamber under vacuum state. Atmosphere is introduced into the vacuum chamber and a space between the first and second seal materials from the air intake opening. Then, a pressure is applied to the first and second substrates by pressure difference between the atmospheric pressure of circumference which surrounds the first substrate and second substrate, and the atmospheric pressure of the space between the first substrate and second substrate.

12 Claims, 5 Drawing Sheets

METHOD OF MANUFACTURING LIQUID CRYSTAL DISPLAY DEVICE

CROSS-REFERENCE TO RELATED APPLICATION

This application is based upon and claims the benefit of priority from Japanese Patent Application No. 2010-131498, filed Jun. 8, 2010, the entire contents of which are incorporated herein by reference.

FIELD

Embodiments described herein relate generally to a method of manufacturing a liquid crystal display device.

BACKGROUND

Liquid crystal display devices are widely used as display devices for various kinds of equipments such as personal computers, OA equipments, and TV sets because the liquid crystal display devices have many advantages such as lightness, compactness and low power consumption. In recent years, the liquid crystal display device has also been used in mobile terminal equipments such as a mobile phone, a car navigation device and a game player.

In recent years, One Drop Fill (ODF) method is put in practical use as one of techniques of forming a liquid crystal display panel. Moreover, a technique of polishing the surface of a substrate is also applied responding to request for a slim down.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A method of manufacturing a liquid crystal display device according to an exemplary embodiment of the present invention will now be described with reference to the accompanying drawings wherein the same or like reference numerals designate the same or corresponding portions throughout the several views.

According to one embodiment, a method of manufacturing a liquid crystal display device includes the steps of preparing a first substrate including a first array region having a first active area and a second array region adjacent to the first array region having a second active area; forming a first seal material in a closed loop shape for surrounding the first active area in the first array region on the first substrate; forming a second seal material in a closed loop shape for surrounding the second active area in the second array region on the first substrate, the second seal material arranged apart from the first seal material; forming a peripheral seal material arranged outside the first and second array regions, the peripheral seal material having an air intake opening; arranging a second substrate on a surface of the first substrate in which the first and second seal materials and the peripheral seal material are formed in a vacuum chamber under vacuum state; applying a pressure to the first and second substrates by pressure difference between the atmospheric pressure of circumference which surrounds the first substrate and second substrate and the atmospheric pressure of a space between the first and second seal materials by introducing atmosphere into the vacuum chamber and the space between the first and second seal materials from the air intake opening; and attaching the first and second substrates by curing the first and second seal materials and the peripheral seal material.

Figure 1:
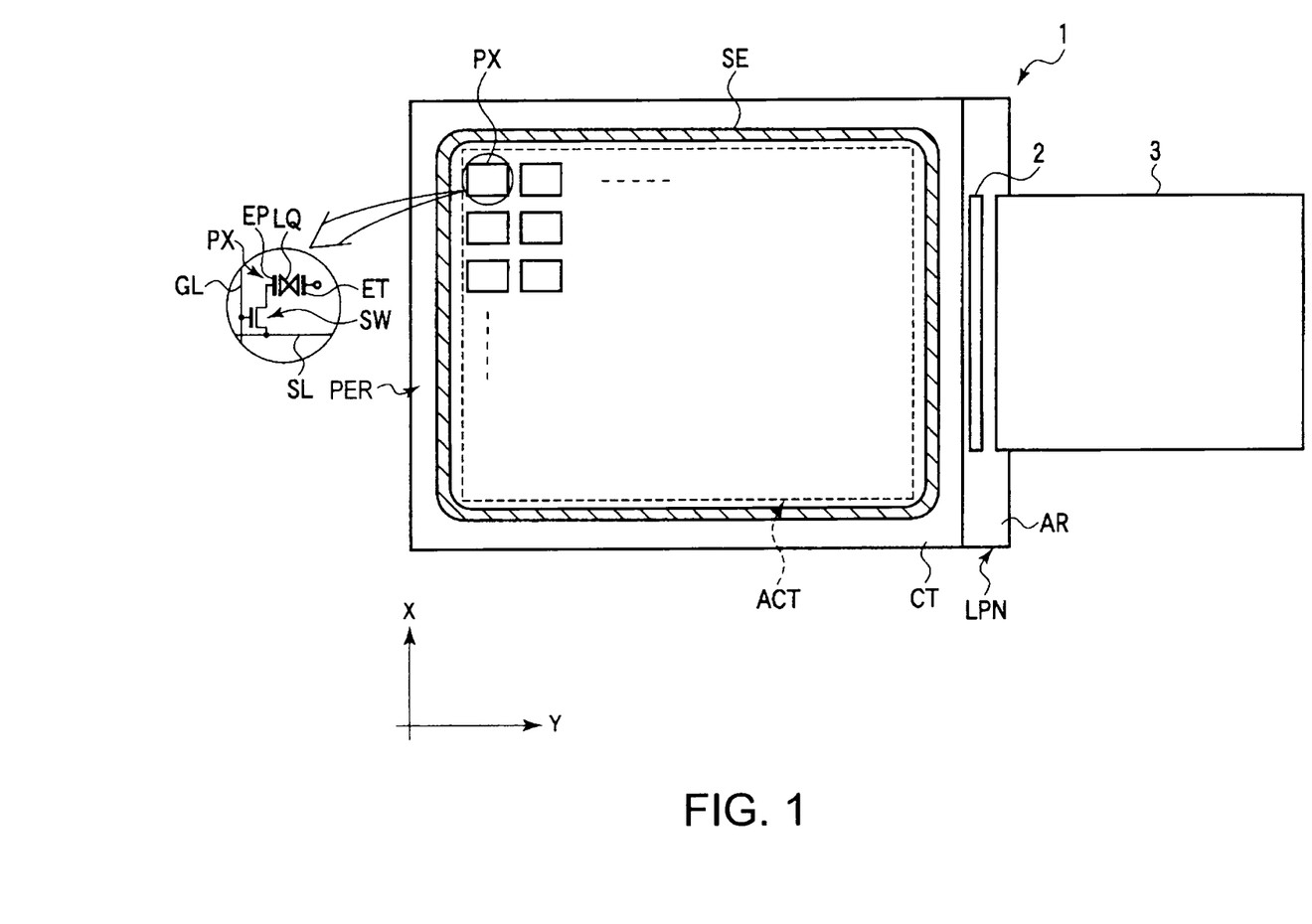
FIG. 1 is a plan view schematically showing a structure of a liquid crystal display device according to one embodiment.

FIG. 1 is a plan view schematically showing the structure of a liquid crystal display device 1 according to one embodiment. The liquid crystal display device 1 includes an active-matrix type liquid crystal display panel LPN, a driver IC chip 2 and a flexible wiring substrate 3, etc. connected to the liquid crystal display panel LPN.

The liquid crystal display panel LPN includes an array substrate AR, a counter substrate CT facing the array substrate AR, and a liquid crystal layer held between the array substrate AR and counter substrates CT. The array substrate AR and counter substrate CT are formed of a glass substrate, respectively and are attached together by a seal material SE. The liquid crystal layer is held in a cell gap formed between the array substrate AR and counter substrate CT at the inner side surrounded by the seal material SE.

The liquid crystal display panel LPN includes an active area ACT of the shape of an approximately rectangle for displaying an image at the inner side surrounded by the seal material SE. The active area ACT is constituted by a plurality of pixels PX arranged in the shape of (m×n) matrix (here, m and n are positive integers). The driver IC chip 2 and flexible wiring substrate 3 are mounted on the array substrate AR in a peripheral area PER outside the active area ACT.

In this embodiment, the seal material SE is formed between the array substrate AR and counter substrate CT in the shape of an approximately rectangular frame so as to surround the active area ACT. In this embodiment, an injecting mouth L1 for injecting liquid crystal material into the gap between the array substrate AR and counter substrate CT is not formed in the seal material SE because One Drop Fill (ODF) method is used to form a liquid crystal layer. However, an injecting method may be used in place of the One Drop Fill (ODF) method.

The seal material SE is formed of at least one of a UV curing resin and a thermosetting resin. The seal material SE may be formed by a screen printing method or a drawing method using a dispenser device.

The composition of each pixel PX is as follows, for example. The array substrate AR includes gate lines GL extending in a first direction X, source lines SL extending in a second direction Y that intersects at right angles with the first direction X, switching elements SW connected with the gate lines GL and source lines SL, picture electrodes EP connected with the switching element SW, etc. A counter electrode ET which counters the picture electrode EP through the liquid crystal layer LQ may be formed on the array substrate AR or the counter substrate CT.

In this embodiment, there is no restriction in particular with respect to the liquid crystal mode. The modes which mainly use vertical electric field such as TN (Twisted Nematic) mode, OCB (Optically Compensated Bend) mode and VA (Vertical Aligned) mode, and the modes which mainly use lateral electric field such as IPS (In-Plane Switching) mode and FFS (Fringe Field Switching) mode are applicable.

In the liquid crystal display panel LPN mentioned above, it is required to raise the uniformity of a cell gap. That is, when the cell gap is not uniform in the active area ACT, the display unevenness occurs. For example, while in the central portion of the active area ACT, a designed cell gap is obtained, the cell gap in a peripheral area of the active area ACT may become smaller than the designed cell gap. Therefore, when a gray display is made in the whole active area, a desired display is not achieved, and the difference of the cell gap is sighted as display unevenness. Therefore, a degradation of the display quality is resulted.

In this embodiment, a phenomenon in which a seal material SE is excessively crushed is reviewed as one of the causes of above fault, and an example of the technique for improving the fault is disclosed.

Moreover, in the process of forming multiple patterns in which a plurality of liquid crystal display panels LPN are formed simultaneously using a large-sized mother substrate, a designed cell gap is obtained in the liquid crystal display panel LPN formed in the central part of the large-sized mother substrate. However, a smaller cell gap than the designed cell gap may be formed in the liquid crystal display panel LPN formed in the peripheral area of the large-sized mother substrate.

In this embodiment, a phenomenon in which a peripheral seal material (to be explained later) formed around the large-sized mother substrate is excessively crushed is reviewed as one of the causes of the fault, and an example of the technique for improving the fault is proposed.

Figure 2:
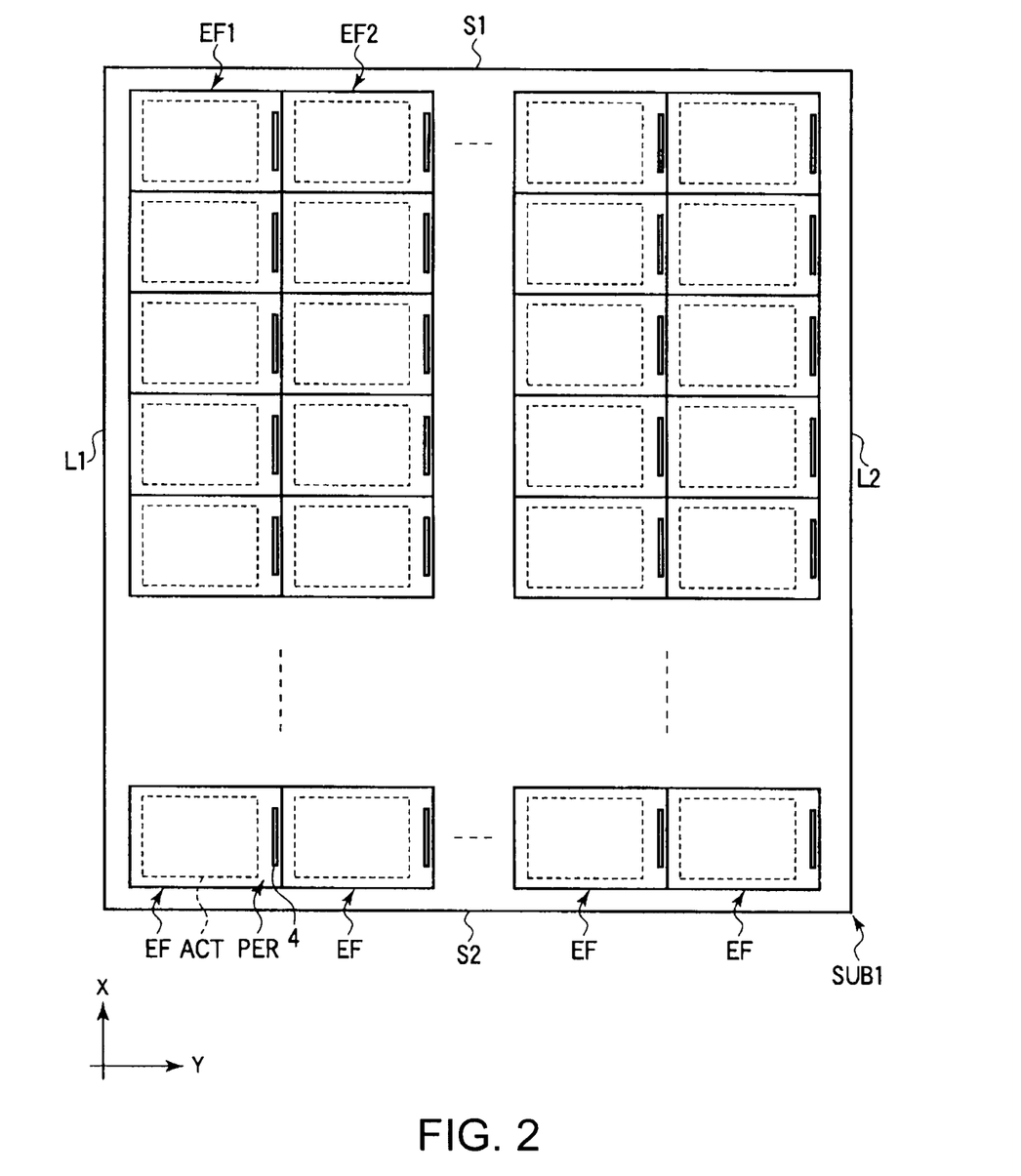
FIG. 2 is a figure for explaining a method of manufacturing a liquid crystal display panel according to the embodiment and is a plan view for explaining a process of preparing a first substrate specifically.

Hereinafter, the manufacturing method of the liquid crystal display panel LPN according to one embodiment is explained. FIG. 2 is a figure for explaining the manufacturing method of the liquid crystal display panel LPN according to this embodiment, and is a plan view for explaining a process of preparing a first substrate SUB1 specifically.

As illustrated, the first substrate SUB1 for forming a plurality of array substrates AR is prepared first. The first substrate SUB1 is a large-sized mother glass and includes a pair of long ends L1 and L2 extending in the first direction X and a pair of short ends S1 and S2 extending in the second direction Y.

In the first substrate SUB1, a plurality of array regions (or effective regions) EF for forming a plurality of array substrates AR are formed. The plurality of array regions EF are arranged in the X and Y directions, i.e., in the shape of a matrix. For example, 100-300 array regions EF are formed in the first substrate SUB1.

The array region EF includes a first array region EF1 and a second array region EF2. The second array region EF2 adjoins the first array region EF1 in the second direction Y.

A solid line in the figure showing the array region EF is a planned cutting line to cut the first substrate SUB1 into individual array substrates AR. That is, each array region EF is an inner region surrounded by the planned cutting lines.

Each array region EF includes the active area ACT and peripheral area PER. In each active area ACT, though detailed illustration is omitted, various insulating films, switching elements SW, picture electrodes EP, etc. are formed. A mounting portion 4 for mounting the driver IC chip 2, the flexible wiring substrate 3, etc. are formed in each peripheral area PER. In each array region, the active area ACT is located in the long end L1 side, and the mounting portion 4 is located in the long end L2 side.

Although not illustrated, a second substrate SUB2 for forming the counter substrate CT is prepared. The second substrate SUB2 is formed by the large-sized glass substrate with an approximately same size as the second substrate SUB1.

Figure 3:
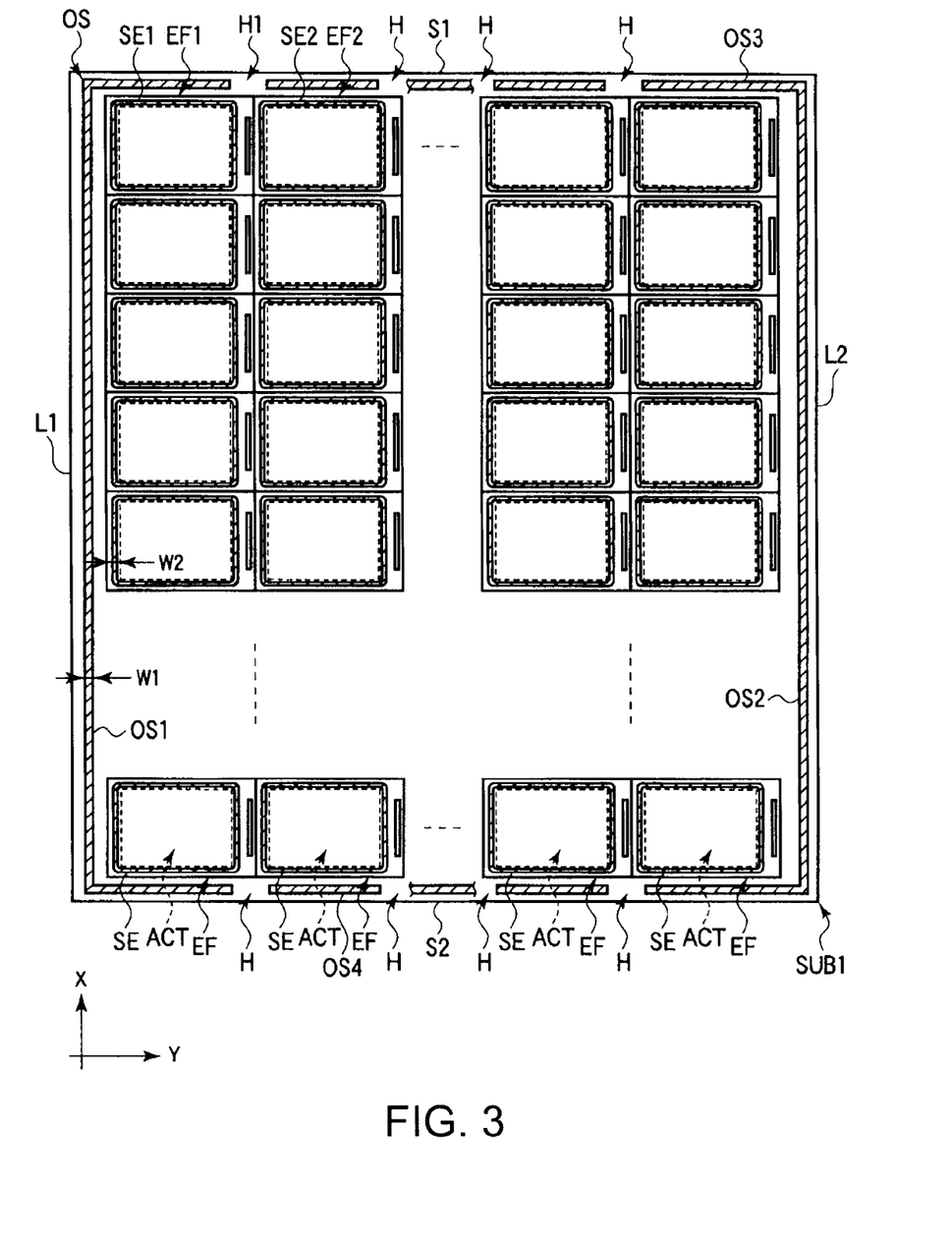
FIG. 3 is a figure for explaining the method of manufacturing the liquid crystal display panel according to the embodiment and is a plan view for explaining a process of forming a seal material and a peripheral seal material specifically.

FIG. 3 is a figure for explaining a manufacturing method of the liquid crystal display panel LPN according to this embodiment and is a plan view for explaining a process for forming the seal material SE and the peripheral seal material OS.

As illustrated, the seal material SE in a closed loop is formed on the first substrate SUB1 so as to surround the active area ACT in each of the array regions EF. The peripheral seal material OS is also formed in the outside of all the array regions EF.

Each seal material SE is apart from other seal materials SE which adjoin each other in the first direction X while being apart from other seal materials SE which adjoin each other in the second direction Y. In the illustrated example, each seal material SE is formed in the shape of an approximately rectangular frame. The seal material SE includes a first seal material SE1 formed in the first array region EF1 and second seal material SE2 formed in the second array region EF2. The second seal material SE2 is apart from the first seal material SE1. A mounting portion 4 formed in the first array region EF1 is located between the first seal material SE1 and the second seal material SE2. The space formed between the first seal material SE1 and second seal material SE2 extends in the first direction X.

The peripheral seal material OS is arranged between the array region EF and the long ends L1 and L2 of the first substrate SUB1, and between the array region EF and the short ends S1 and S2 of the first substrate SUB1. Namely, the peripheral seal material OS is composed of a first straight line portion OS1 and a second straight line portion OS2 extending in the first direction X, and a third straight line portion OS3 and a fourth straight line portion OS4 extending in the second direction Y. The peripheral seal material OS is apart from any seal materials SE.

At least one air intake opening H is formed in the peripheral seal material OS. In the illustrated example, the peripheral seal material OS is formed approximately in the shape of a rectangular frame except for the intake opening H. Namely, each of the first straight line portion OS1 and second straight line portion OS2 extending along the long end L1 of the first substrate SUB1 continuously extends without breaking off on the way. On the contrast, each of the third straight line portion OS3 extending along the short end S1 and fourth straight line portion OS4 extending along the short end S2 in the first substrate SUB1 discontinuously extends with breaking off on the way.

That is, the air intake openings H correspond to portions in which the peripheral seal material OS is partially missing, and are formed in each of the third straight line portion OS3 extending along the short end S1 and the fourth straight line portion OS4 extending along the short end S2 in the first substrate SUB1.

It is preferable that the intake opening H is formed so as to correspond to the space formed between adjoining seal materials SE. In the illustrated example, the intake opening H1 is formed corresponding to the space formed between the first seal material SE1 and the second seal material SE2, for example. That is, the intake opening H1 is located on a line extending in the first direction X between the first seal material SE1 and the second seal material SE2.

The line width W1 of the peripheral seal material OS is larger than the line width W2 of the seal material SE. For example, while the line width W1 of the peripheral seal material OS is about 2 mm-3 mm, the line width W2 of the seal material SE is equal or less than 1 mm, and the distances W2 is about 0.8 mm here.

The peripheral seal material OS is formed of the same material as the seal material SE, for example, at least one of a UV curing type resin and a heat thermosetting type resin. Moreover, the peripheral seal material OS may be formed with the seal material SE by a screen printing method or a drawing method by a dispenser.

Figure 4:
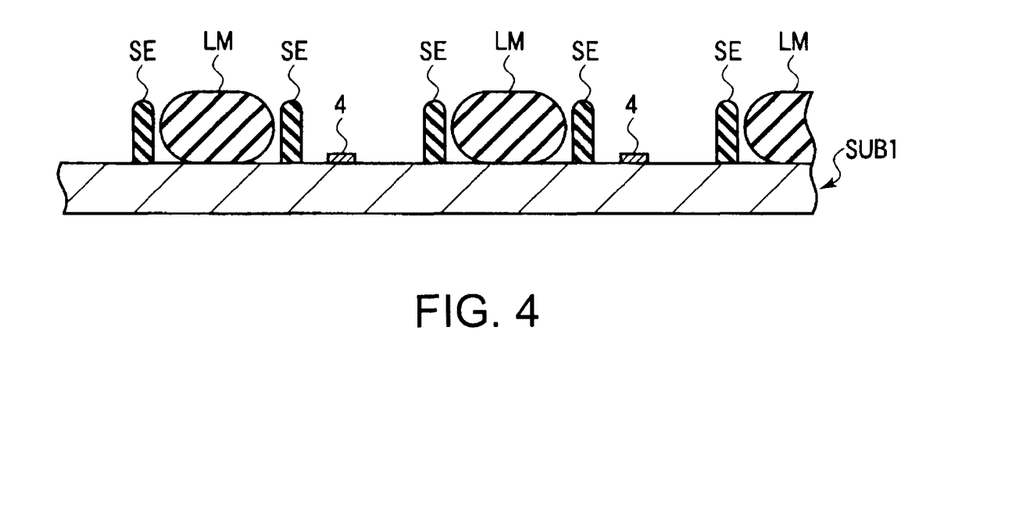
FIG. 4 is a figure for explaining the method of manufacturing the liquid crystal display panel according to the embodiment and is a cross-sectional view for explaining a process of dropping a liquid crystal material specifically.

FIG. 4 is a figure for explaining the manufacturing method of the liquid crystal display panel LPN according to this embodiment, and is a cross-sectional view for explaining a process of dropping the liquid crystal material LM specifically.

As illustrated, the liquid crystal material LM is dropped at the inner side surrounded by the seal material SE in each of the array region EF on the first substrate SUB1. The dropped amount of the liquid crystal material LM is set by a design value of the cell gap and a capacity of the inner side surrounded by the seal material SE, etc.

Figure 5:
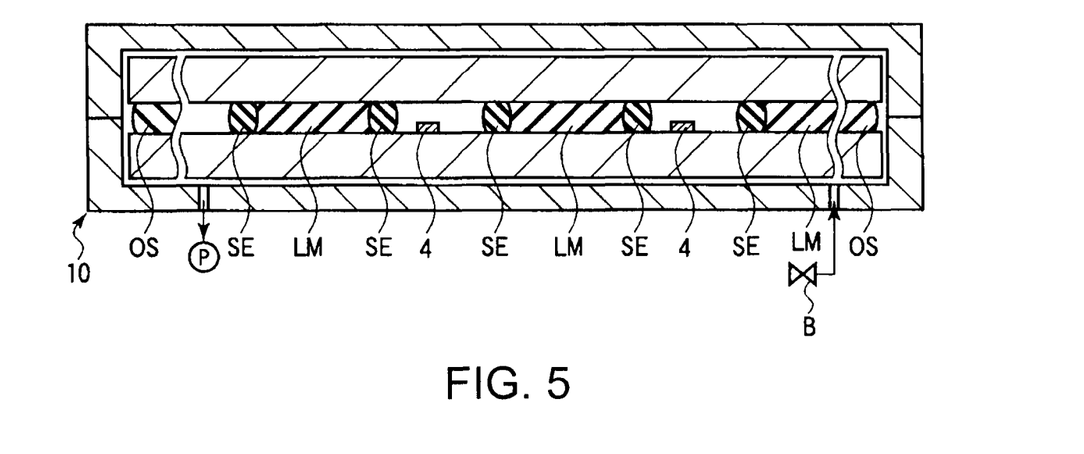
FIG. 5 is a figure for explaining the method of manufacturing the liquid crystal display panel according to the embodiment and is a cross-sectional view for explaining a process of applying a pressure to first and second substrates specifically.

FIG. 5 is a figure for explaining the manufacturing method of the liquid crystal display panel LPN according to this embodiment, and is a cross-sectional view for explaining a process of pressurizing the first substrate SUB1 and second substrate SUB2.

As illustrated, in a vacuum chamber 10, a pump P for exhausting its inside and a valve B for controlling introduction of the atmosphere to its inside are connected to the vacuum chamber 10, which is equipped with a jig for applying a pressure to the first substrate SUB1 and second substrate SUB2.

The substrate SUB1 on which the liquid crystal material LM was dropped is set in the inside of the vacuum chamber 10, and the second substrate SUB2 is arranged on the side of the first substrate SUB1 at which the liquid crystal material LM was dropped. That is, the second substrate SUB2 is arranged on each of the seal material SE and peripheral seal material OS formed on the first substrate SUB1, and the liquid crystal material LM dropped inside each seal material SE.

Then, the first substrate SUB1 and second substrate SUB2 are pressurized so that a predetermined cell gap is formed between the first substrate SUB1 and second substrate SUB2 in each array region EF of the first substrate SUB1.

When forming the plurality of liquid crystal display panels LPN using the large-sized mother substrate as described-above, the counter resistance against applied pressure by the seal material SE and the peripheral seal material OS formed in each array region EF tends to become large, and such seal material SE and the peripheral seal material OS are not crushed easily. For this reason, bigger load is needed in order to form a desired cell gap between first substrate SUB1 and second substrate SUB2.

In this embodiment, first, the inside of the vacuum chamber 10 is decompressed to about 1 Pa to make the inside of the vacuum chamber 10 in a vacuum state. Then, load is applied to the substrate SUB1 and second substrate SUB2 using a jig by sandwiching the substrates SUB1 and SUB2. After applying a pressure to the substrates SUB1 and SUB2 so as to crush the seal material SE and the peripheral seal material OS to some extent for a predetermined time, the inside of the vacuum chamber 10 is returned to the atmospheric pressure.

At this time, the atmosphere or inactive gas, such as dry air, nitrogen gas ($N_2$), etc., is introduced into the inside of the vacuum chamber 10. Accordingly, it becomes possible to apply uniformly a needed load (atmospheric load) to form a predetermined gap by pressure difference between the atmospheric pressure of the inner side surrounded by the seal material SE and peripheral seal material OS, and the atmospheric pressure of the circumference which surrounds the first substrate SUB1 and second substrate SUB2.

However, if the atmospheric pressure load is too strong, the seal material SE and peripheral seal material OS are crushed too much. Accordingly, as described-above, the cell gap smaller than the design value is formed in the liquid crystal display panel LPN near the peripheral seal material OS. Furthermore, in the liquid crystal display panel LPN arranged near the peripheral seal material OS, a cell gap smaller than the design value is formed near the seal material SE.

Then, in this embodiment, as mentioned-above, the peripheral seal material OS is equipped with the air intake opening H. The air intake opening H communicates an internal region surrounded by the peripheral seal material OS between the first substrate SUB1 and second substrate SUB2, i.e., a region including the plurality array regions EF, with the exterior.

For this reason, when the atmosphere is introduced into the inside of the vacuum chamber 10, the atmosphere is introduced to inside of the peripheral seal material OS from the air intake opening H formed in the peripheral seal material OS. That is, the atmosphere is introduced into the space between the first substrate SUB1 and second substrate SUB2 surrounded by the peripheral seal material OS, i.e., the space between adjoining seal materials SE.

Thereby, although the pressure of the space between the first substrate SUB1 and second substrate SUB2 was in the vacuum state, the pressure gradually approaches to the atmospheric pressure with the introducing of the atmosphere from the air intake opening H. That is, the pressure of the space between the first substrate SUB1 and second substrate SUB2 becomes approximately equal or below the atmospheric pressure after the atmosphere has been introduced into the inside of the vacuum chamber 10.

In addition, time T1 in which after the atmosphere has been introduced into the inside of the vacuum chamber 10, the atmospheric pressure of the circumference which surrounds the first substrate SUB1 and second substrate SUB2 reaches to the atmospheric pressure is shorter than time T2 in which the atmospheric pressure of the space between the first substrate SUB1 and the second substrate SUB2 reaches to the atmospheric pressure.

For this reason, immediately after introducing the atmosphere into the inside of the vacuum chamber 10, the pressure difference arises between the atmospheric pressure of the circumference which surrounds the first substrate SUB1 and second substrate SUB2, and the atmospheric pressure of the space between first substrate SUB1 and the second substrate SUB2. Accordingly, the first substrate SUB1 and second substrate SUB2 are pressurized by sufficient pressure to crush the seal material SE and peripheral seal material OS.

On the other hand, after the atmosphere has been introduced into the inside of the vacuum chamber 10, the pressure difference between the atmospheric pressure of the circumference which surrounds the first substrate SUB1 and second substrate SUB2, and the atmospheric pressure of the space between the first substrate SUB1 and the second substrate SUB2 becomes small with progress of time. Thereby, the pressure applied to the first substrate SUB1 and second substrate SUB2 decreases, and it becomes possible to control excessive crushing of the seal material SE and peripheral seal material OS.

Thus, as a desired cell is formed between the first substrate SUB1 and second substrate SUB2, the liquid crystal material LM dropped inside each seal material SE spreads between the first substrate SUB1 and second substrate SUB2, and fills the space surrounded by the seal material SE with the crashing of the seal material SE.

Then, while a desired cell gap is formed between the first substrate SUB1 and second substrate SUB2, the first substrate SUB1 and second substrate SUB2 are pasted together by curing the seal material SE and peripheral seal material OS. The process to cure the seal material SE and peripheral seal material OS is performed by combining UV exposure process and heating process suitably. Moreover, such curing process may be performed inside the vacuum chamber 10 or with other equipment different from the vacuum chamber 10.

Figure 6:
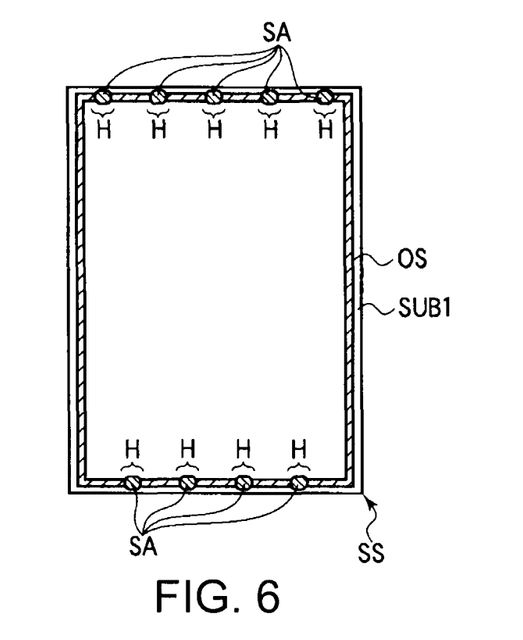
FIG. 6 is a figure for explaining the method of manufacturing the liquid crystal display panel according to the embodiment and is a plan view for explaining a process of polishing the first and second substrates specifically.

FIG. 6 is a figure for explaining the manufacturing method of the liquid crystal display panel LPN according to this embodiment, and is a plan view for explaining a process of polishing the first substrate SUB1 and second substrate SUB2. In addition, the first substrate SUB1 side of a substrate set SS which are pasted together by the first substrate SUB1 and second substrate SUB2 is illustrated here.

As illustrated, in the substrate set SS, the intake opening H of the peripheral seal material OS is sealed by a sealing agent SA. Then, each surface of the first substrate SUB1 and second substrate SUB2 which constitute the substrate set SS is polished. The polish processing is performed by at least one of the chemical polishing and machine polishing.

In the chemical polishing, the substrate set SS is put in solution, such as fluoric acid, for example, and the surfaces of the first substrate SUB1 and second substrate SUB2, i.e., the surfaces opposing the surfaces attached by the peripheral seal material OS are polished. The machine polishing is performed by cutting the surface of first substrate SUB1 and second substrate SUB2 or grinding the surface using an abrading agent, for example.

Each glass substrate which constitutes the first substrate SUB1 and second substrate SUB2 is polished by such polish processing, and the first substrate SUB1 and second substrate SUB2 are made thin.

Figure 7:
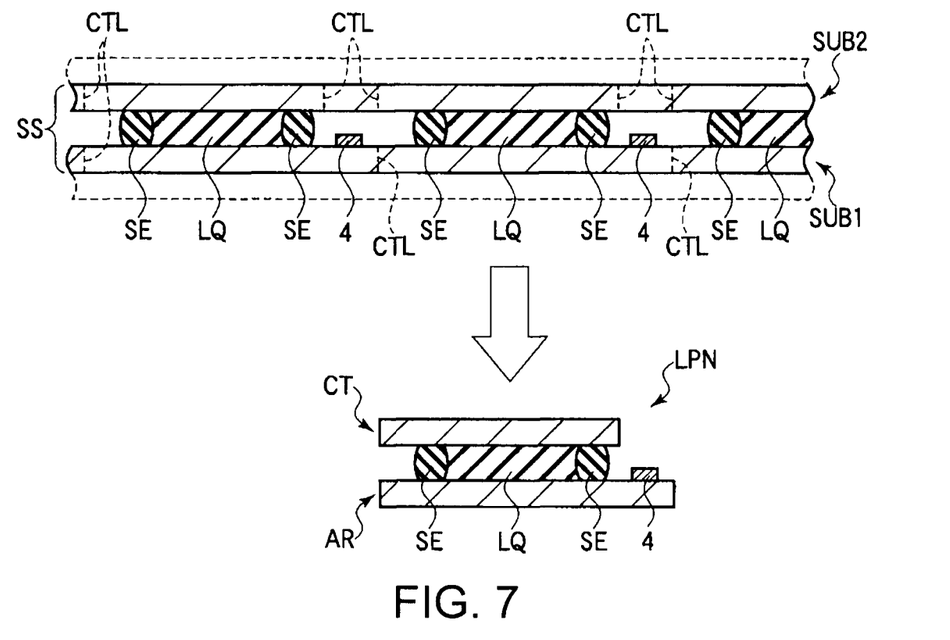
FIG. 7 is a figure for explaining the method of manufacturing the liquid crystal display panel according to the embodiment and is a cross-sectional view for explaining a process of cutting a substrate set into each liquid crystal display panel specifically.

FIG. 7 is a figure for explaining the manufacturing method of the liquid crystal display panel LPN according to this embodiment, and is a sectional view for explaining a process of cutting the substrate set SS into the individual liquid crystal display panel LPN.

As illustrated, in the substrate set SS, each thickness of the first substrate SUB1 and second substrate SUB2 is made thin by the above-mentioned polishing process. Both of the first substrate SUB1 and second substrate SUB2 are cut along the planned line CTL extending in the first direction X, for example. Thereby, while the array substrate AR is taken out from the first substrate SUB1, the counter substrate CT is taken out from the second substrate SUB2, and the liquid crystal display panel LPN holding the liquid crystal layer LQ between the array substrate AR and the counter substrate CT is taken out.

Thus, in any of the liquid crystal display panels LPN cut from the substrate set SS, the uniform cell gap was formed and display unevenness was not sighted.

Moreover, the air intake opening H of the peripheral seal material OS is formed so as to counter the space formed between adjoining seal materials SE. For this reason, when the atmosphere is introduced from the air intake opening H, it passes along the space between seal materials SE without being interfered with the introduced atmosphere by seal materials SE, and is promptly led to the space between first substrate SUB1 and second substrate SUB2 surrounded by the peripheral seal material OS.

Thereby, when pressurizing the first substrate SUB1 and second substrate SUB2, the pressure difference between the atmospheric pressure of the circumference which surrounds the first substrate SUB1 and second substrate SUB2, and the atmospheric pressure of the space between the first substrate SUB1 and second substrate SUB2 is reduced with progress of time. Accordingly, it becomes possible to control excessive crushing of the seal material SE and the peripheral seal material OS.

Moreover, since the seal material SE and peripheral seal material OS are formed of the same material, it becomes possible to form the seal materials using the same process. Moreover, as the technique of forming the seal material SE and peripheral seal material OS, either technique of screen-printing method or drawing method can be applied.

Moreover, in the process of polishing the first substrate SUB1 and second substrate SUB2, since the polishing is carried out after the air intake opening H formed in the peripheral seal material OS is sealed by the sealing agent SA, the array region EF is held in an airtight state. Thereby, in the process of polishing the first substrate SUB1 and second substrate SUB2, any techniques of the chemical polishing and the machine polishing are applicable.

In the above embodiment, One Drop Fill (ODF) method is used to form the liquid crystal layer in the liquid crystal display panel. However, an injecting method may be used in place of the ODF method. In the injecting method, the first and second substrates are cut into liquid crystal display panel units each having a plurality of liquid crystal display panels. The liquid crystal material is injected into the space surrounded by the seal material and the first and second substrates through the injecting mouth formed in the sealing material of each liquid crystal display panel.

As explained-above, according to this embodiment, a manufacturing process in which it becomes possible to raise the evenness of the cell gap can be offered. Therefore, it is possible to manufacture a high quality liquid crystal display device with high manufacturing yield.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a liquid crystal display device, comprising:

preparing a first substrate including a first array region having a first active area and a second array region adjacent to the first array region having a second active area;

forming a first seal material in a closed loop shape for surrounding the first active area in the first array region on the first substrate;

forming a second seal material in a closed loop shape for surrounding the second active area in the second array region on the first substrate, the second seal material arranged apart from the first seal material;

forming a peripheral seal material arranged outside the first and second array regions, the peripheral seal material having an air intake opening;

forming at least one air intake opening in the peripheral seal material at a position facing a space formed between the first and second seal materials;

arranging a second substrate on a surface of the first substrate in which the first and second seal materials and the peripheral seal material are formed in a vacuum chamber under vacuum state;

applying a pressure to the first and second substrates by pressure difference between an atmospheric pressure of circumference which surrounds the first substrate and second substrate and an atmospheric pressure of the space between the first and second seal materials by introducing atmosphere into the vacuum chamber and the space between the first and second seal materials from the air intake opening; and attaching the first and second substrates by curing the first and second seal materials and the peripheral seal material.

2. The method of manufacturing a liquid crystal display device according to claim 1, wherein the forming at least one air intake opening forms a plurality of air intake openings in the peripheral seal material.

3. The method of manufacturing a liquid crystal display device according to claim 1, wherein the seal material and the peripheral seal material are formed of the same material using at least one of a UV curing resin and a thermosetting resin.

4. The method of manufacturing a liquid crystal display device according to claim 1, wherein the seal material and the peripheral seal material are formed of a screen printing method or a drawing method using a dispenser.

5. The method of manufacturing a liquid crystal display device according to claim 1, further comprising a step of polishing the surfaces of the first and second substrates after sealing the air intake opening.

6. The method of manufacturing a liquid crystal display device according to claim 5, wherein the step of polishing the surfaces of the first and second substrates is performed by at least one of a chemical polishing method and a mechanical polishing method.

7. A method of manufacturing a liquid crystal display device, comprising:

preparing a first substrate including a first array region having a first active area and a second array region adjacent to the first array region having a second active area;

forming a first seal material in a closed loop shape for surrounding the first active area in the first array region on the first substrate;

forming a second seal material in a closed loop shape for surrounding the second active area in the second array region on the first substrate, the second seal material arranged apart from the first seal material;

forming a peripheral seal material arranged outside the first and second array regions;

forming at least one air intake opening in the peripheral seal material at a position facing a space formed between the first and second seal materials;

dropping a liquid crystal material in a space surrounded by each of the first and second seal materials;

arranging a second substrate on a surface of the first substrate in which the first and second seal materials and the peripheral seal material are formed in a vacuum chamber under vacuum state;

applying a pressure to the first and second substrates by pressure difference between an atmospheric pressure of circumference which surrounds the first substrate and second substrate and an atmospheric pressure of the space between the first and second seal materials by introducing atmosphere into the vacuum chamber and the space between the first and second seal materials from the air intake opening;

attaching the first and second substrates by curing the first and second seal materials and the peripheral seal material, and cutting the first and second substrates into individual liquid crystal display panels each having the array region.

8. The method of manufacturing a liquid crystal display device according to claim 7, wherein the forming at least one air intake opening forms a plurality of air intake openings in the peripheral seal material.

9. The method of manufacturing a liquid crystal display device according to claim 7, wherein the seal material and the peripheral seal material are formed of the same material using at least one of a UV curing resin and a thermosetting resin.

10. The method of manufacturing a liquid crystal display device according to claim 7, wherein the seal material and the peripheral seal material are formed of a screen printing method or a drawing method using a dispenser.

11. The method of manufacturing a liquid crystal display device according to claim 7, further comprising a step of polishing the surfaces of the first and second substrates after sealing the air intake opening.

12. The method of manufacturing a liquid crystal display device according to claim 11, wherein the step of polishing the surfaces of the first and second substrates is performed by at least one of the chemical polishing method and mechanical polishing method.

* * * * *